US008626391B2

(12) United States Patent
     Kim

(10) Patent No.: US 8,626,391 B2
(45) Date of Patent: Jan. 7, 2014

(54) METHOD AND SYSTEM FOR LANE-KEEPING CONTROL

(75) Inventor: Soon Tae Kim, Yongin-si (KR)

(73) Assignee: Mando Corporation, Pyeongtaek-Si (KR)

( * ) Notice: Subject to any disclaimer, the term of this patent is extended or adjusted under 35 U.S.C. 154(b) by 342 days.

(21) Appl. No.: 13/049,324

(22) Filed: Mar. 16, 2011

(65) Prior Publication Data

US 2011/0231062 A1  Sep. 22, 2011

(30) Foreign Application Priority Data

Mar. 17, 2010  (KR) .................. 10-2010-0023712
Feb. 14, 2011  (KR) .................. 10-2011-0012628

(51) Int. Cl.
*B62D 6/00* (2006.01)
(52) U.S. Cl.
USPC .................................... 701/41; 701/1
(58) Field of Classification Search
USPC ............ 701/41, 300, 301, 36, 70, 1; 303/146; 180/402, 169, 168; 477/469, 475
See application file for complete search history.

(56) References Cited

U.S. PATENT DOCUMENTS

| 7,107,137 B2 * | 9/2006 | Tange et al. ................ 701/70 |
| 7,561,032 B2 * | 7/2009 | Huang et al. ................ 340/435 |
| 2003/0062769 A1 * | 4/2003 | Matsumoto et al. .......... 303/146 |

* cited by examiner

*Primary Examiner* — Marthe Marc-Coleman
(74) *Attorney, Agent, or Firm* — McDermott Will & Emery LLP

(57) ABSTRACT

A Lane-keeping control method and system of a vehicle include an estimated control entry boundary arrival time setting controller for setting an estimated control entry boundary arrival time to arrive at a control entry boundary and a look-ahead distance calculator for calculating a look-ahead distance on the basis of the estimated control entry boundary arrival time and vehicle velocity. A lane-keeping control entry determiner determines whether to enter the lane-keeping control on the basis of the control entry boundary, a lane-keeping control torque producer produces a lane-keeping control torque in a direction opposite to a lane-departure direction whether to enter lane-keeping control, and a torque releasing controller releases the lane-keeping control torque when the vehicle has returned to the inside of a control release boundary after the lane-keeping control torque was produced.

19 Claims, 9 Drawing Sheets

- 100
- ESTIMATED CONTROL ENTRY BOUNDARY ARRIVAL TIME SETTING UNIT — 110
- LOOK-AHEAD DISTANCE CALCULATING UNIT — 120
- CROSSWISE POSITION VALUE CALCULATING UNIT — 130
- LANE-KEEPING CONTROL ENTRY DETERMINING UNIT — 140
- LANE-KEEPING CONTROL TORQUE PRODUCING UNIT — 150
- LANE-KEEPING CONTROL TORQUE RELEASING UNIT — 160
- BOUNDARY SETTING UNIT — 170

(a)

(b)

(c)

METHOD AND SYSTEM FOR LANE-KEEPING CONTROL

CROSS-REFERENCE TO RELATED APPLICATION

This application claims priority from and the benefit under 35 U.S.C. §19(a) of Korean Patent Application No. 10-2010-0023712 filed on Mar. 17, 2010 and Korean Patent Application No. 10-2011-0012628 filed on Feb. 14, 2011, which are hereby incorporated by reference for all purposes as if fully set forth herein.

BACKGROUND OF THE INVENTION

1. Field of the Invention

The present invention relates to lane-keeping control, and more particularly to a lane-keeping control method and system which can previously estimate a vehicle condition at a predetermined distance ahead of the vehicle, and which enables lane-keeping control to be conducted stably and efficiently in accordance with the previously estimated results.

2. Description of the Prior Art

Recently, as vehicles have become intelligent, various control technologies are applied to vehicles. Those control technologies involve a technology for sensing a lane using a camera to control a vehicle not to depart from the lane, or to control the vehicle to follow the center of the lane on the basis of the lane sensing results.

In accordance with the conventional lane-keeping control technologies, until lane-keeping control is practically conducted after a lane departure situation is sensed for a vehicle, a time delay may be caused due to various reasons, which may lead to failure in preventing the lane departure of the vehicle.

SUMMARY OF THE INVENTION

Accordingly, the present invention has been made to solve the above-mentioned problems occurring in the prior art, and an object of the present invention is to calculate a look-ahead distance in accordance with a vehicle condition so as to conduct lane-keeping control efficiently on the basis of the calculated look-ahead distance.

Another object of the present invention is to previously estimate a vehicle condition at a distance ahead of the vehicle so as to conduct lane-keeping control for the vehicle stably and efficiently on the basis of the estimated results.

Another object of the present invention is to set a look-ahead distance which makes it possible to acquire lane information for allowing lane-keeping control to be correctly conducted.

Also, another object of the present invention is to adaptively set a look-ahead distance on the basis of at least one of a road condition and a vehicle condition to acquire lane information so as to conduct more correct lane-keeping control.

In order to accomplish these objects, there is provided a lane-keeping control system which calculates a look-ahead distance on the basis of a vehicle condition, and conducts lane-keeping control on the basis of the calculated look-ahead distance.

In accordance with an aspect of the present invention, the inventive lane-keeping control system includes: an estimated control entry boundary arrival time setting unit for setting an estimated control entry boundary arrival time to be taken by a vehicle to arrive at a control entry boundary, wherein the control entry boundary is set for entering lane-keeping control for the vehicle; a look-ahead distance calculating unit for calculating a look-ahead distance on the basis of the estimated control entry boundary arrival time and the vehicle's velocity; a crosswise error calculating unit for calculating a crosswise error of the vehicle estimated ahead of the look-ahead distance; a lane-keeping control entry determining unit for determining whether to enter the lane-keeping control on the basis of the crosswise error and the control entry boundary; a lane-keeping control torque producing unit for producing lane-keeping control torque in a direction opposite to the lane-departure direction when it is determined that it is necessary to enter lane-keeping control as the result of the determination by the lane-keeping control entry determining unit, wherein the lane-keeping control torque urges the vehicle to return to the inside of the control entry boundary; and a torque release unit for releasing the lane-keeping control torque when it is determined that the vehicle has returned to the inside of a control release boundary, after the lane-keeping control torque was produced, wherein the control release boundary is set for releasing the lane-keeping control for the vehicle.

In accordance with another aspect of the present invention, the lane-keeping control system includes: a look-ahead distance setting unit for setting a look-ahead distance on the basis of at least one information item of a vehicle condition and a road condition; a lane information acquiring unit for acquiring lane information in accordance with the set look-ahead distance; an auxiliary steering torque calculating unit for calculating auxiliary steering torque for lane-keeping control on the basis of the acquired lane information; and a lane-keeping control unit for conducting lane-keeping control by producing the calculated auxiliary steering torque at a steering control apparatus.

In order to achieve the above-mentioned objects, there is also provided a lane-keeping control method provided by the inventive lane-keeping control system, wherein the method includes the steps of: calculating an estimated control entry boundary arrival time to be taken by a vehicle to arrive at a control entry boundary, wherein the control entry boundary is set for entering lane-keeping control for the vehicle; calculating a look-ahead distance on the basis of the estimated control entry boundary arrival time and the vehicle's velocity; calculating a crosswise error of the vehicle estimated ahead of the look-ahead distance; determining whether to enter the lane-keeping control on the basis of the crosswise error and the control entry boundary; producing lane-keeping control torque in a direction opposite to the lane-departure direction when it is determined that it is necessary to enter lane-keeping control as the result of the determination by the lane-keeping control entry determining unit, wherein the lane-keeping control torque urges the vehicle to return to the inside of the control entry boundary; and releasing the lane-keeping control torque when it is determined that the vehicle has returned to the inside of a control release boundary after the lane-keeping control torque was produced, wherein the control release boundary is set for releasing the lane-keeping control for the vehicle.

As described above, in accordance with the present invention, it is possible to conduct lane-keeping control efficiently on the basis of a look-ahead distance calculated in accordance with the vehicle condition.

Also, in accordance with the present invention, it is possible to estimate in advance a vehicle condition at a distance ahead of the vehicle, and to conduct stable and efficient lane-keeping control in accordance with the estimated result.

Consequently, it is possible to solve a problem that has prevented lane-keeping control from being conducted when the line-keeping control is required, due to a time delay in a system.

In addition, in accordance with the present invention, lane-keeping control can be conducted more precisely, so that the entry and release of lane-keeping control can be prevented from being frequently caused.

In addition, in accordance with the present invention, it is possible to set a look-ahead distance which enables acquisition of lane information adapted to allow lane-keeping control to be correctly conducted.

Moreover, in accordance with the present invention, lane information can be obtained by adaptively setting a look-ahead distance in accordance with at least one of a vehicle condition and a road condition, whereby lane-keeping control can be conducted more precisely.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
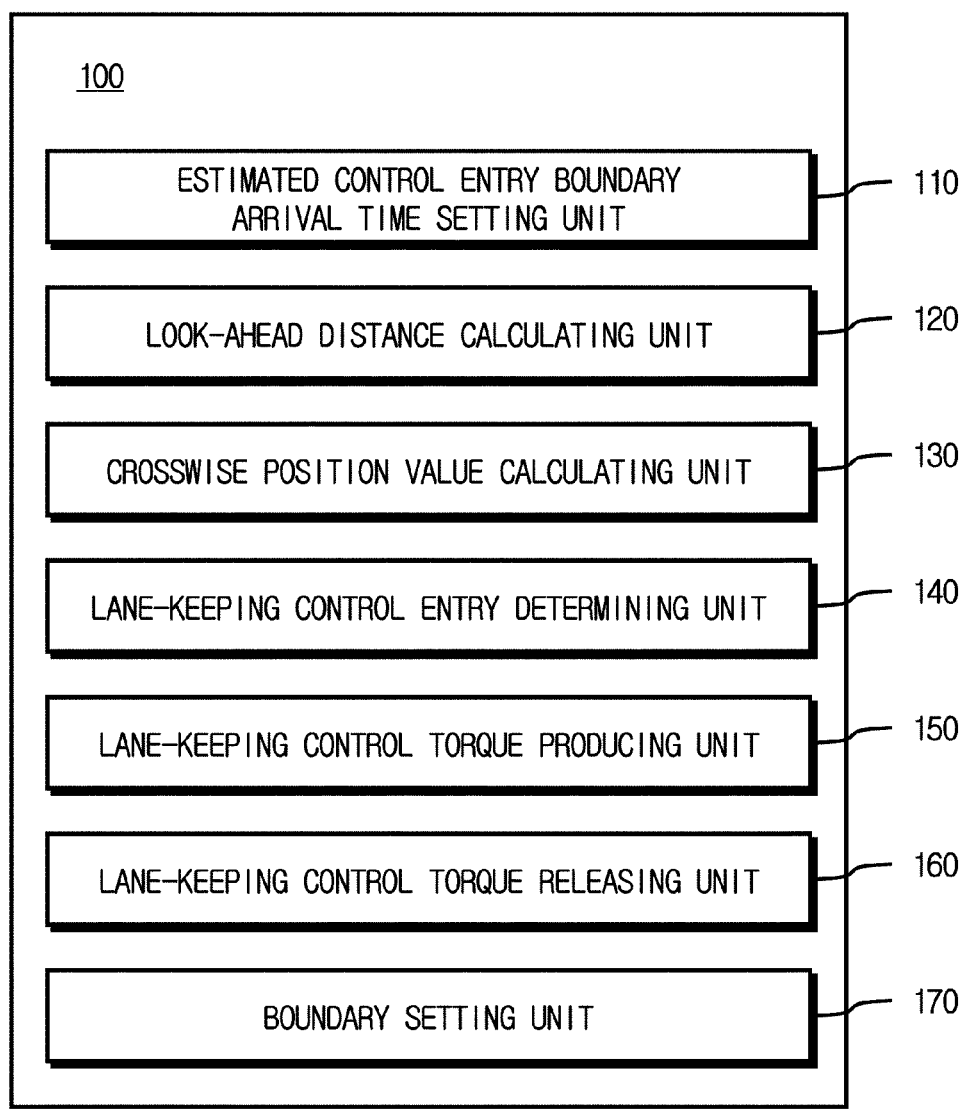
FIG. 1 is a block diagram of a lane-keeping control system in accordance with an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram for a lane-keeping control system 100 in accordance with an embodiment of the present invention.

The inventive lane-keeping control system 100 exemplified in FIG. 1 determines whether to enter lane-keeping control with reference to a vehicle condition estimated at a predetermined distance ahead of the vehicle in consideration of a time delay and a time required for increasing torque (hereinafter, to be referred to as "torque increasing time"), which are entailed in the system, and if it is determined that lane-keeping control should be entered, the inventive lane-keeping control system 100 produces lane-keeping control torque required for the line-keeping control.

Figure 2:
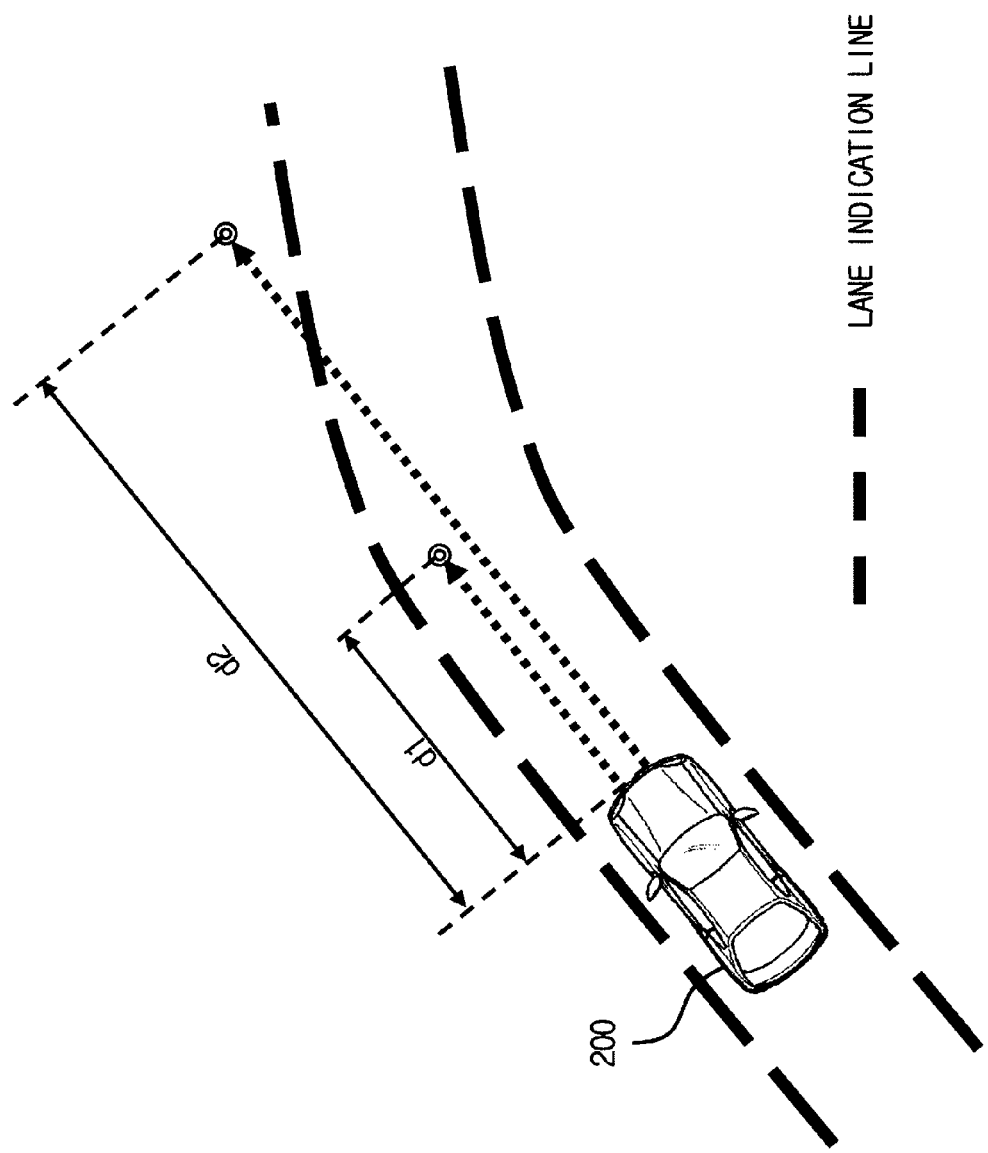
FIG. 2 is a view for describing lane-keeping control by the inventive lane-keeping control system.

Referring to FIG. 2, the inventive lane-keeping control system 100 calculates a look-ahead distance on the basis of an estimated control entry boundary arrival time, which has been previously set, and the current vehicle's velocity, and if the calculated look-ahead distance is d1, the inventive lane-keeping control system 100 estimates that a crosswise error (which may be also referred to as "crosswise position value") of the vehicle 200 estimated ahead of the look-ahead distance d1 would not arrive at the previously set control entry boundary, and hence prevents lane-keeping control from being entered.

However, if the calculated look-ahead distance is d2, the inventive lane-keeping control system 100 estimates that the crosswise error of the vehicle 200 estimated ahead of the look-ahead distance d2 may pass over the control entry boundary, and determines that it is necessary to enter lane-keeping control, and hence the inventive lane-keeping control system starts to produce lane-keeping control toque required for the lane-keeping control.

More specifically, as shown in FIG. 1, the inventive lane-keeping control system 100 includes: an estimated control entry boundary arrival time setting unit 110 for setting an "estimated control entry boundary arrival time" to be taken by a vehicle to arrive at a "control entry boundary," wherein the control entry boundary is set for entering lane-keeping control for the vehicle; a look-ahead distance calculating unit 120 for calculating a "look-ahead distance" on the basis of the estimated control entry boundary arrival time and the vehicle's velocity; a crosswise error calculating unit 130 for calculating a "crosswise error" of the vehicle estimated ahead of the look-ahead distance; a lane-keeping control entry determining unit 140 for determining whether to enter lane-keeping control on the basis of the crosswise error and the control entry boundary; a lane-keeping control torque producing unit 150 for producing "lane-keeping control torque" in a direction opposite to a lane departure direction when it is determined that it is necessary to enter lane-keeping control as the result of the determination by the lane-keeping control entry determining unit 140, wherein the lane-keeping control torque urges the vehicle to return to the inside of the control entry boundary; and a torque release unit 160 for releasing the lane-keeping control torque when it is determined that the vehicle has returned to the inside of a "torque release boundary," after the lane-keeping control torque was produced, wherein the torque release boundary is set for releasing lane-keeping control for the vehicle.

The estimated control entry boundary arrival time setting unit 110 may set an estimated control entry boundary arrival time to meet a system transfer characteristic condition as expressed by Equation 1 below, in which the system transfer characteristic condition is determined by a camera data operation period, a vehicle network transmission period, and a torque increasing time.

$$T_{entry} \geq t1+t2+t3 \qquad \text{Equation 1}$$

In Equation 1, $T_{entry}$ is an estimated control entry boundary arrival time, t1 is a camera data operation period, and t2 is a vehicle network transmission period. The term, t3, is a torque increasing time, which can be defined by the maximum allowed torque and the maximum torque change rate. For example, the torque increasing time may be a value obtained by dividing the maximum allowed torque by the maximum torque change rate.

The look-ahead distance calculating unit 120 may calculate a look-ahead distance by multiplying the estimated control entry boundary arrival time ($T_{entry}$) and the current vehicle's velocity as in Equation 2 below, wherein the estimated control entry boundary arrival time is set by the estimated control entry boundary arrival time setting unit 110.

$$d=v \times T_{entry} \qquad \text{Equation 2}$$

The crosswise error calculating unit 130 may calculate the crosswise error of the vehicle estimated ahead of the look-ahead distance, which is calculated by the look-ahead distance calculating unit 120, on the basis of the lane information acquired from the camera (for example, the lane information may include the position information of the center of the corresponding road), and the vehicle's current yaw rate. Here, the crosswise error may mean a distance of a certain point from a reference point (e.g. the center of the road), wherein the crosswise error may be referred to as a crosswise position value since if it is assumed that the position value of the reference point is zero, the distance equal to the crosswise error may be the position value as it is.

In addition, when calculating the crosswise error, the crosswise error calculating unit 130 may reflect the vehicle's current behavior condition so as to more precisely calculate the vehicle's crosswise error estimated ahead of the look-ahead distance.

The above-mentioned crosswise error calculating method will be described with reference to FIG. 3 by way of an example.

Figure 3:
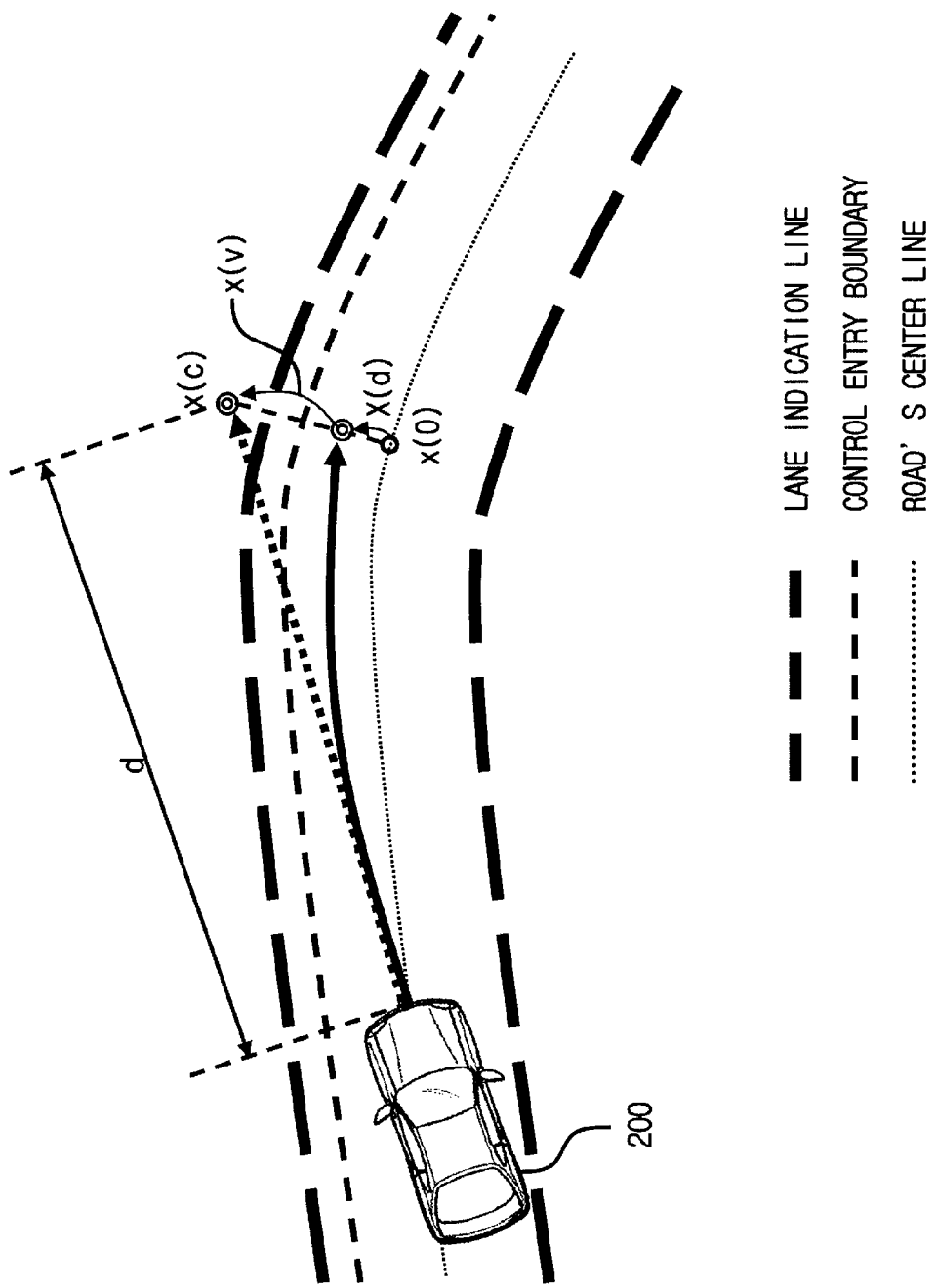
FIG. 3 is a view for describing a method for calculating a crosswise error of a vehicle estimated ahead of the look-ahead distance in the vehicle by reflecting the vehicle's current behavior condition.

FIG. 3 is a view for describing a method for calculating a crosswise error of a vehicle estimated ahead of the look-ahead distance of the vehicle by reflecting the vehicle's current behavior condition.

Referring to FIG. 3, if it is assumed that the reference point is the center of the road, the crosswise error calculating unit 130 may obtain x(0), that is the crosswise error of the center of the road, from lane information, or may grasp the crosswise error by receiving an input from the lane information acquiring unit.

The crosswise error calculating unit 130 calculates the crosswise error at the look-ahead distance d from a camera on a straight line (i.e. the crosswise distance between a point away from the camera by the look-ahead distance d on a straight line and the center of the road). At this time, the crosswise error at the look-ahead distance d from the sensor (e.g., camera) on a straight line is referred to as x(c).

Thereafter, the crosswise error calculating unit 130 estimates the crosswise movement extent x(v) estimated ahead of the look-ahead distance d by reflecting the behavior condition. The crosswise movement extent x(v) estimated ahead of the look-ahead distance d may be calculated using Equation 3 below.

$$x(v)=d*YR/v \qquad \text{Equation 3}$$

In Equation 3, d is a look-ahead distance, YR is a vehicle's yaw rate, and v is a vehicle's velocity.

Next, the crosswise error calculating unit 130 may finally calculate the vehicle's crosswise error X(d) estimated ahead of the look-ahead distance d by subtracting the estimated vehicle's crosswise movement extent x(v) from the calculated x(c) (that is, X(d)=x(c)−x(v)).

As shown in FIG. 1, the inventive lane-keeping control system 100 may further include a boundary setting unit 170, wherein the boundary setting unit 170 determines a virtual line by connecting first points positioned inside of a road at a first distance from a lane indication line and sets the virtual line as a control entry boundary, and the boundary setting unit 170 determines a virtual line by connecting second points positioned inside of the road at a second distance from the control entry boundary and sets the virtual line as a torque release boundary.

Depending on how the entry boundary is set by the boundary setting unit 170, the lane-keeping control entry may be too frequently conducted. In particular, if a road's width is narrow, a vehicle's crosswise error may arrive at the control entry boundary too easily, which may cause the lane-keeping control to be frequently conducted. Therefore, the boundary setting unit 170 should set the control entry boundary more carefully according to lane information, such as a road's width and curvature (which may be lane information acquired through a camera).

Figure 4:
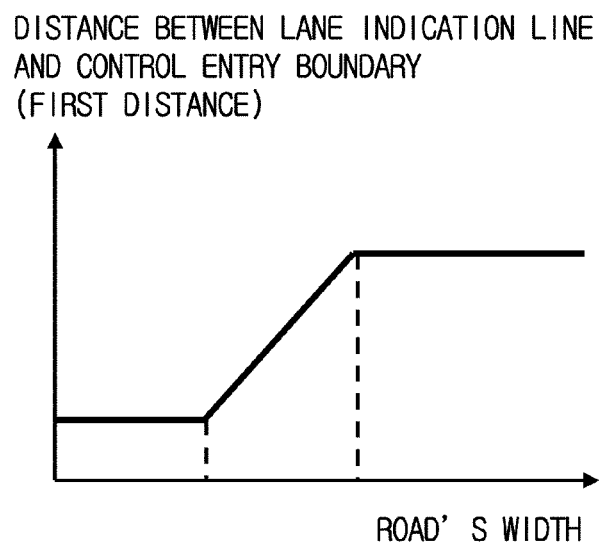
FIG. 4 is a graph showing a control entry boundary which serves as a reference for the inventive lane-keeping control system's entering lane-keeping control in relation to a road's width.

For example, the boundary setting unit 170 may set the control entry boundary on the basis of a road's width, wherein as shown in FIG. 4, if a road's width is within a predetermined road's width range, it is possible to set the control entry boundary in such a manner that the first distance from a lane indication line to the inside of the road (that is, the distance between the lane indication line and the control entry boundary) is proportional to the road's width. That is, if the road's width is narrow, the control entry boundary may be set to be close to the lane indication line, and if the road's width is wide, the first distance may be set longer so as to set the control entry boundary to be remote from the lane indication line.

In addition, in setting the control entry boundary and the control release boundary, the boundary setting unit 170 should adjust and set the distance between the control entry boundary and the control release boundary more carefully in order to prevent the entry and release of the lane-keeping control from being unnecessarily repeated. For example, if the distance between the control entry boundary and the control release boundary is set to be excessively narrow, the lane-keeping control may be released too easily after the lane-keeping control entry is conducted, and then the lane-keeping control entry may be conducted too easily.

Such frequent repetition of lane-keeping control entry and release may easily occur on a road with a large curvature but may rarely occur on a road with a small curvature.

Figure 5:
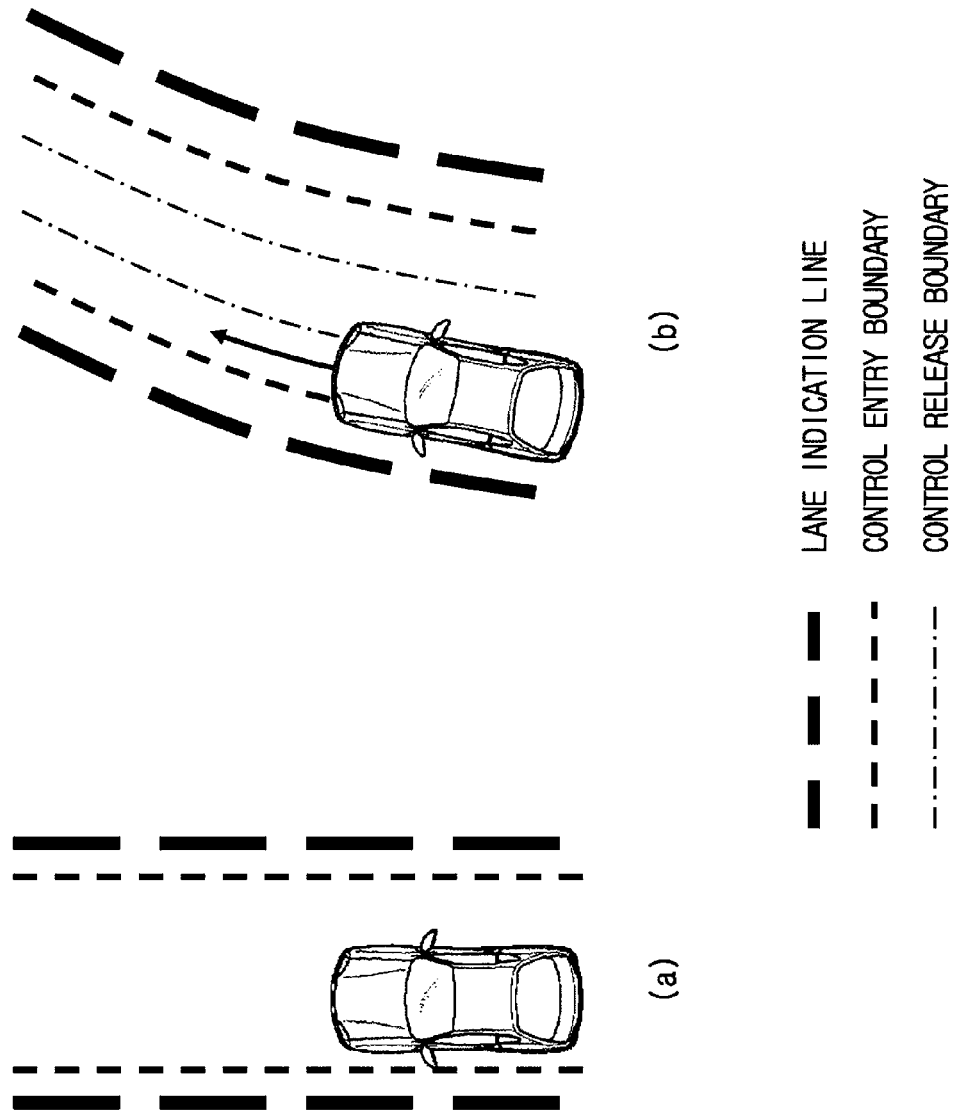
FIGS. 5a and 5b show control release boundaries, each of which serves as a reference for the inventive lane-keeping control system's releasing of lane-keeping control, in relation to a straight road and a curved road, respectively.

Considering the fact that the frequency of repetition of lane-keeping control entry and release is varied depending on a road's curvature, the boundary setting unit 170 may set the control entry boundary to coincide with the control release boundary on a straight road (see FIG. 5*a*), but not to coincide with the control release boundary on a curved road (see FIG. 5*b*), for example.

Figure 6:
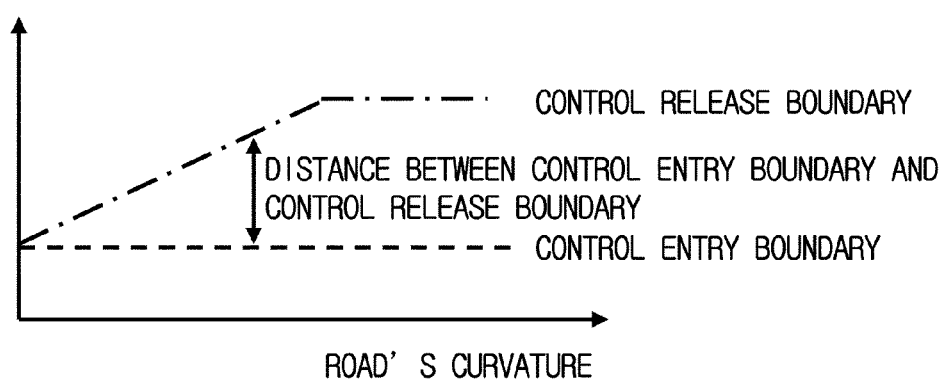
FIG. 6 is a graph showing control entry and control release boundaries, which serve as references for the inventive lane-keeping control system's entering and releasing of lane-keeping control, respectively, in relation to a road's curvature.

If it is generalized to set the control entry boundary and the control release boundary in consideration of the fact that the frequency of repetition of lane-keeping control entry and release is varied depending on a road's curvature, the boundary setting unit 170 may adjust the distance between the control entry boundary and the control release boundary depending on the road's curvature, wherein if the road's curvature is within a predetermined road's curvature range, the boundary setting unit 170 may adjust the distance between the control entry boundary and the control release boundary by setting the distance between the control entry boundary and the control release boundary to be proportional to the road's curvature (see FIG. 6).

After the lane-keeping control entry was conducted as a vehicle arrived at or passed over the control entry boundary, if the vehicle is positioned between the control entry boundary and the control release boundary as the vehicle's crosswise error enters into the inside of the control entry boundary, and if the road is curved, the lane-keeping control torque producing unit 150 produces torque for urging the vehicle to follow the curved road so as to maintain the lane-keeping control without releasing the control.

Now, a lane-keeping control system in accordance with another embodiment of the present invention will be described with reference to FIGS. 7 and 8.

Figure 7:
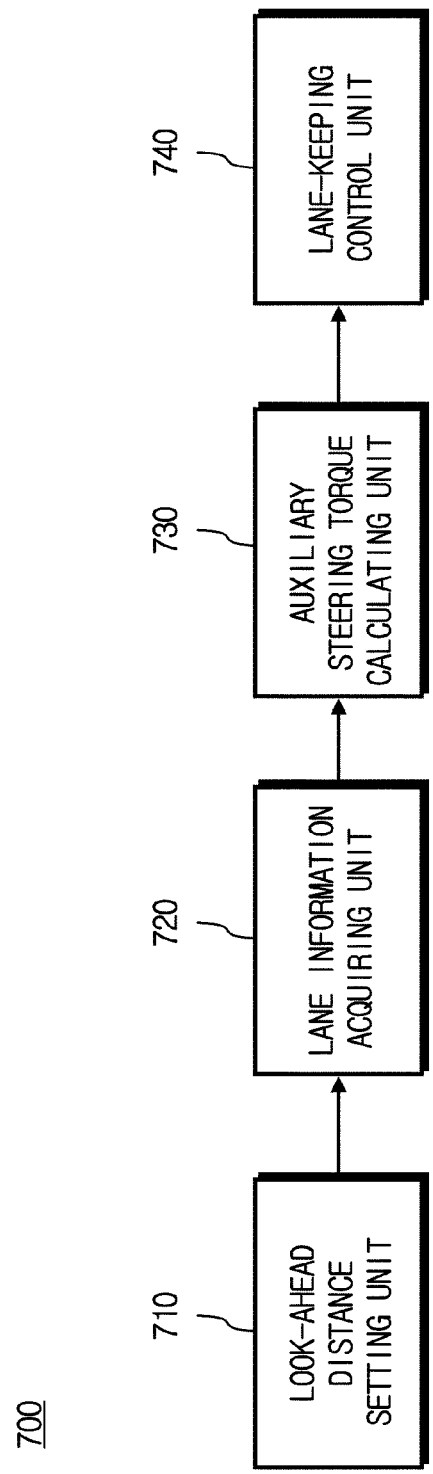
FIG. 7 shows a lane-keeping control unit in accordance with another embodiment of the present invention.
Figure 8:
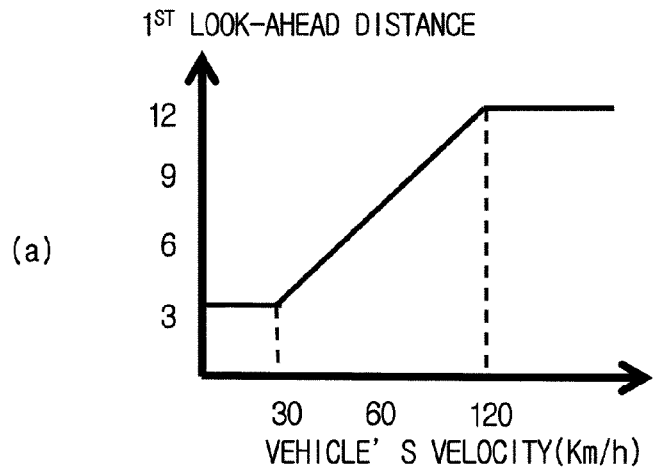
FIGS. 8a to 8c show a graph of a vehicle's velocity versus look-ahead distance, a graph of a road's curvature versus look-head distance, and a graph of a road's width versus look-ahead distance in a lane-keeping control system in accordance with another embodiment of the present invention, respectively.
Figure 8:
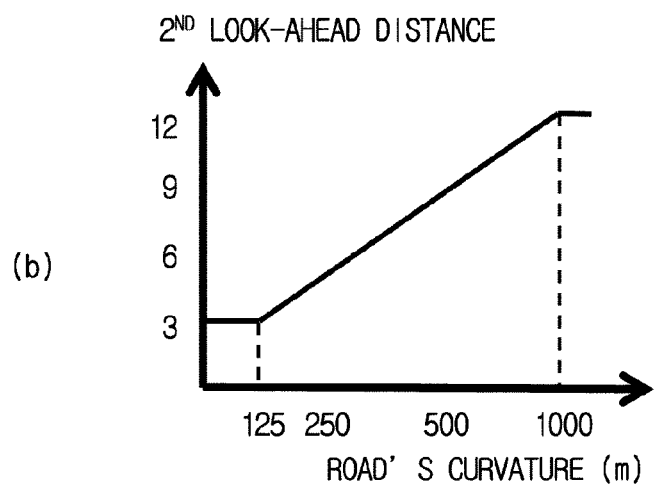
Figure 8:
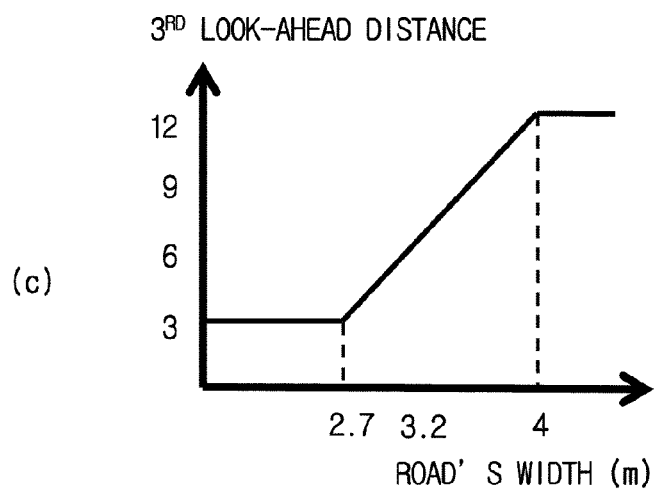

FIG. 7 shows a lane-keeping control system 700 in accordance with another embodiment of the present invention, Referring to FIG. 7, the inventive lane-keeping control system 700 includes: a look-ahead distance setting unit 710 for setting a look-ahead distance on the basis of one or more information items of a vehicle condition and a road condition; a lane information acquiring unit 720 for acquiring lane information depending on the set look-ahead distance; an auxiliary steering torque calculating unit 730 for calculating auxiliary steering torque for controlling lane-keeping on the basis of the acquired lane information; and a lane-keeping control unit 740 for conducting lane-keeping control by producing the calculated auxiliary steering torque at a steering control apparatus.

The vehicle condition may include a vehicle's velocity, and the road condition may include at least one of a road's curvature and width.

The look-ahead distance setting unit 710 may sum a first look-ahead distance corresponding to the vehicle's velocity, a second look-ahead distance corresponding to the road's curvature, and a third look-head distance corresponding to the road's width, and set the value obtained thereby as the look-ahead distance.

FIGS. 8*a* to 8*c* show a graph of a vehicle's velocity versus a look-ahead distance, a graph of a road's curvature versus a look-head distance, and a graph of a road's width versus a look-ahead distance in a lane-keeping control system in accordance with another embodiment of the present invention, respectively.

Referring to FIGS. 8*a* to 8*c*, it can be confirmed that the first look-ahead distance proportionally corresponds to a vehicle's velocity in a predetermined vehicle's velocity range, the second look-ahead distance proportionally corresponds to a road's curvature, and the third look-ahead distance proportionally corresponds to a road's width.

Hereinbelow, a lane-keeping control method provided by the inventive lane-keeping control system 100 described above will be described briefly again.

Figure 9:
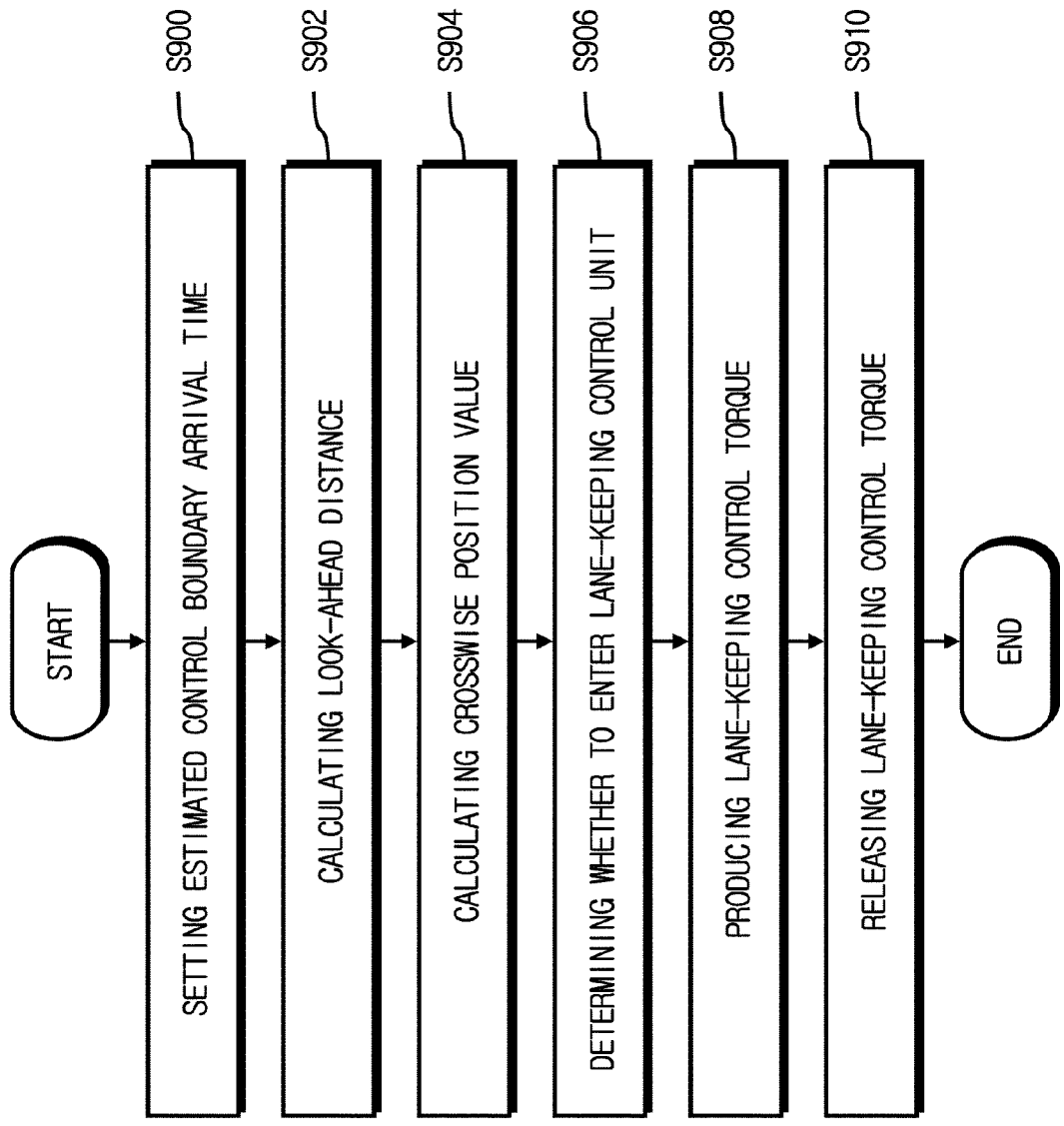
FIG. 9 shows a flowchart for a lane-keeping control unit in accordance with another embodiment of the present invention.

FIG. 9 shows a flowchart of a lane-keeping control method in accordance with an embodiment of the present invention.

Referring to FIG. 9, the inventive lane-keeping control method includes the steps of: calculating an estimated control entry boundary arrival time to be taken by a vehicle to arrive at a control entry boundary, wherein the control entry boundary is set for entering into lane-keeping control for the vehicle (S900); calculating a look-ahead distance on the basis of the estimated control entry boundary arrival time and the vehicle's velocity (S902); calculating a crosswise error of the vehicle estimated ahead of the look-ahead distance (S904); determining whether to initiate lane-keeping control on the basis of the crosswise error and the control entry boundary (S906); producing lane-keeping control torque in a direction opposite to a lane-departure direction when it is determined that it is necessary to enter the lane-keeping control as the result of the determination, wherein the lane-keeping control torque urges the vehicle to return to the inside of the control entry boundary (S908); and releasing the lane-keeping control torque when it is determined that the vehicle has returned to the inside of a torque release boundary, after the lane-keeping control torque was produced, wherein the torque release boundary is set for releasing the lane-keeping control for the vehicle (S910).

As described above, in accordance with the present invention, it is possible to conduct lane-keeping control efficiently on the basis of a look-ahead distance calculated in accordance with the vehicle condition.

Also, in accordance with the present invention, it is possible to estimate in advance a vehicle condition at a distance ahead of the vehicle, and to conduct stable and efficient lane-keeping control in accordance with the estimated result.

Consequently, it is possible to solve a problem that has prevented lane-keeping control from being conducted when the line-keeping control is required, due to a time delay in a system.

Also, in accordance with the present invention, lane-keeping control can be conducted more precisely, so that the entry and release of lane-keeping control can be prevented from being frequently caused.

In addition, in accordance with the present invention, it is possible to set a look-ahead distance which enables acquisition of lane information adapted to allow lane-keeping control to be correctly conducted.

Moreover, in accordance with the present invention, lane information can be obtained by adaptively setting a look-ahead distance in accordance with at least one of a vehicle condition and a road condition, whereby lane-keeping control can be conducted more precisely.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units within an object and scope of the present invention. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A lane-keeping control system calculating a look-ahead distance on the basis of a vehicle condition, and conducting a lane keeping control on the basis of the calculated look-ahead distance comprising:
    an estimated control entry boundary arrival time setting controller configured for setting an estimated control entry boundary arrival time to be taken by a vehicle to arrive at a control entry boundary, wherein the control entry boundary is set for entering lane-keeping control for the vehicle;
    a look-ahead distance calculator configured for calculating a look-ahead distance on the basis of the estimated control entry boundary arrival time and a velocity of the vehicle;
    a lane-keeping control entry determiner configured for determining whether to enter the lane-keeping control on the basis of the control entry boundary;
    a lane-keeping control torque producer configured for producing a lane-keeping control torque in a direction opposite to a lane-departure direction when it is necessary to enter the lane-keeping control as a result of the determination by the lane-keeping control entry determiner, wherein the lane-keeping control torque urges the vehicle to return to the inside of the control entry boundary; and
    a torque releasing controller configured for releasing the lane-keeping control torque when the vehicle has returned to the inside of a control release boundary, after the lane-keeping control torque was produced.

2. The lane-keeping control system as claimed in claim 1, wherein the estimated control entry boundary arrival time setting controller sets the estimated control entry boundary arrival time in such a manner that a system transfer characteristic condition can be met, in which the estimated control entry boundary arrival time is determined by a camera data operation period, a vehicle network transmission period, and a torque increasing time.

3. The lane-keeping control system as claimed in claim 2, wherein the torque increasing time is determined by a maximum allowed torque and a maximum torque change rate.

4. The lane-keeping control system as claimed in claim 1, wherein the look-ahead distance calculator calculates the look-ahead distance by multiplying the estimated control entry boundary time and the vehicle velocity.

5. The lane-keeping control system as claimed in claim 1, wherein the crosswise error calculator calculates the vehicle crosswise error estimated ahead of the look-ahead distance on the basis of the lane information acquired from the camera and a vehicle yaw rate.

6. The lane-keeping control system as claimed in claim 1, further comprising a boundary setting determiner, wherein the boundary setting determiner determines a virtual line by connecting first points positioned at a first distance from a lane indication line to the inside of the road, and sets the virtual line as the control entry boundary, and the boundary setting determiner determines a virtual line by connecting second points positioned at a second distance from the control entry boundary to the inside of the road, and sets the virtual line as the control release boundary.

7. The lane-keeping control system as claimed in claim 6, wherein the boundary setting determiner sets the control entry boundary on the basis of a width of the road.

8. The lane-keeping control system as claimed in claim 7, wherein if the width of the road is within a predetermined road width range, the boundary setting determiner sets the control entry boundary in such a manner that the first distance to the inside of the road from the lane indication line is proportional to the width of the road.

9. The lane-keeping control system as claimed in claim 6, wherein the boundary setting determiner adjusts the distance between the control entry boundary and the control release boundary in accordance with a curvature of the road.

10. The lane-keeping control system as claimed in claim 9, wherein if the curvature of the road is within a predetermined road curvature range, the boundary setting determiner sets the control entry boundary in such a manner that the first distance to the inside of the road from the lane indication line is proportional to the curvature of the road.

11. The lane-keeping control system as claimed in claim 9, wherein the boundary setting determiner sets the control entry boundary and the control release boundary to coincide with each other on a straight road, but not to coincide with each other on a curved road.

12. The lane-keeping control system as claimed in claim 11, wherein the lane-keeping control torque producer produces torque which urges the vehicle to follow the curved road when the vehicle is positioned between the control entry boundary and the control release boundary in the curved road.

13. The lane-keeping control system of claim 1, further comprising;
    a crosswise error calculator for calculating a crosswise error of the vehicle estimated ahead of the look-ahead distance.

14. A lane-keeping control system calculating a look-ahead distance on the basis of a vehicle condition, and conducting a lane keeping control on the basis of the calculated look-ahead distance comprising:
    a look-ahead distance setting determiner configured for setting a look-ahead distance on the basis of at least one information item of a vehicle condition and a road condition;

a lane information acquirer configured for acquiring lane information in accordance with the set look-ahead distance;

an auxiliary steering torque calculator configured for calculating auxiliary steering torque for lane-keeping control on the basis of the acquired lane information; and a lane-keeping controller configured for conducting lane-keeping control by producing the calculated auxiliary steering torque at a steering control apparatus.

15. The lane-keeping control system as claimed in claim 14, wherein the vehicle condition includes a velocity of the vehicle, and the road condition includes at least one of a curvature and a width of the road.

16. The lane-keeping control system as claimed in claim 15, wherein the look-ahead distance setting determiner sums a first look-ahead distance corresponding to the velocity of the vehicle, a second look-ahead distance corresponding to the curvature of the road, and a third look-ahead distance corresponding to the width of the road, and sets the value obtained thereby as the look-ahead distance.

17. The lane-keeping control system as claimed in claim 16, wherein the first look-ahead distance proportionally corresponds to the velocity of the vehicle in a predetermined vehicle velocity range, the second look-ahead distance proportionally corresponds to the road curvature in a predetermined road curvature range, and the third look-ahead distance proportionally corresponds to the road width in a predetermined road width range.

18. A lane keeping control method which comprises steps of:

calculating an estimated control entry boundary arrival time to be taken by a vehicle to arrive at a control entry boundary, wherein the control entry boundary is set for entering lane-keeping control for the vehicle;

calculating, a look-ahead distance on the basis of the estimated control entry boundary arrival time and vehicle velocity;

calculating, by a computer, a crosswise error of the vehicle estimated ahead of the look-ahead distance;

determining, by a computer, whether to enter the lane-keeping control on the basis of the crosswise error and the control entry boundary;

applying to the vehicle a lane-keeping control torque in a direction opposite to a lane-departure direction when it is necessary to enter the lane-keeping control as a result of the step of determining, such that the lane-keeping control torque urges the vehicle to return to the inside of the control entry boundary; and releasing, the lane-keeping control torque when the vehicle has returned to the inside of the control release boundary after the lane-keeping control torque was applied.

19. A lane-keeping control method, performed by a computer programmed stored in a non-transitory computer readable storage medium to carry out the steps of:

calculating an estimated control entry boundary arrival time to be taken by a vehicle to arrive at a control entry boundary, wherein the control entry boundary is set for entering lane-keeping control for the vehicle;

calculating a look-ahead distance on the basis of the estimated control entry boundary arrival time and a vehicle velocity;

calculating a crosswise error of the vehicle estimated ahead of the look-ahead distance;

determining whether to enter the lane-keeping control on the basis of the crosswise error and the control entry boundary;

applying to the vehicle a lane-keeping control torque in a direction opposite to a lane-departure direction when it is necessary to enter the lane-keeping control as a result of the step of determining, such that the lane-keeping control torque urges the vehicle to return to the inside of the control entry boundary; and releasing the lane-keeping control torque when the vehicle has returned to the inside of the control release boundary after the lane-keeping control torque was applied.

* * * * *